United States Patent [19]

Sartorio

[11] Patent Number: 5,488,880
[45] Date of Patent: Feb. 6, 1996

[54] TWO-SPEED LINEAR ACTUATOR DRIVEN BY TWO MOTORS

[75] Inventor: Franco Sartorio, Turin, Italy

[73] Assignee: Amada Company, Limited, Japan

[21] Appl. No.: 78,318

[22] PCT Filed: Dec. 23, 1991

[86] PCT No.: PCT/EP91/02506

§ 371 Date: Jun. 28, 1993

§ 102(e) Date: Jun. 28, 1993

[87] PCT Pub. No.: WO92/12362

PCT Pub. Date: Jul. 23, 1992

[30]   Foreign Application Priority Data

Dec. 27, 1990 [IT] Italy .................................. 68065-A/90

[51] Int. Cl.⁶ .................................................. F16H 25/20
[52] U.S. Cl. ................... 74/424.8 B; 74/89.15; 72/454; 254/103; 254/DIG. 2
[58] Field of Search ........................... 74/424.8 B, 89.15; 72/390, 454; 254/103, DIG. 2

[56]   References Cited

U.S. PATENT DOCUMENTS

| | | | |
|---|---|---|---|
| 2,023,841 | 12/1935 | Kingsbury | 74/424.8 B X |
| 2,285,099 | 6/1942 | Specht | 72/454 X |
| 2,375,172 | 5/1945 | Arter | 74/424.8 B |
| 2,520,014 | 8/1950 | Rehnberg et al. | 192/116.5 |
| 2,630,022 | 3/1953 | Terdina | 74/424.8 B |
| 2,703,129 | 3/1955 | Smith | 72/454 X |
| 4,614,128 | 9/1986 | Fickler | 74/424.8 B |
| 4,693,131 | 9/1987 | Teramachi | 74/424.8 B |
| 4,703,666 | 11/1987 | Fickler | 74/89.15 |

FOREIGN PATENT DOCUMENTS

| | | |
|---|---|---|
| 0253735 | 1/1988 | European Pat. Off. . |
| 60-247496 | 12/1985 | Japan . |
| 714003 | 8/1954 | United Kingdom . |

OTHER PUBLICATIONS

International Search Report dated May 15, 1992.

*Primary Examiner*—Allan D. Herrmann
*Attorney, Agent, or Firm*—Wigman, Cohen, Leitner & Myers

[57]   ABSTRACT

A two-speed linear actuator with high thrust and a high speed of translation for a machine, particularly a bending press. A linear actuator for a machine, particularly a bending press, having first and second bodies (2, 4) mounted for sliding relative to each other and a male-and-female screw mechanism (14) for controlling a relative sliding movement of the two bodies along a working line. The male screw (16) and the female screw (27) are supported for rotation by the first and second bodies (2, 4) and can be rotated by respective electric motors (24, 38). The motors (24, 38) are associated with respective speed-reduction devices (22, 26 and respectively 36) having substantially different reduction ratios. The actuator further includes a braking device (42, 44) associated with the member of the male-and-female screw mechanism (14) which is connected to the speed reduction device (22, 26) with the lower reduction ratio.

8 Claims, 5 Drawing Sheets

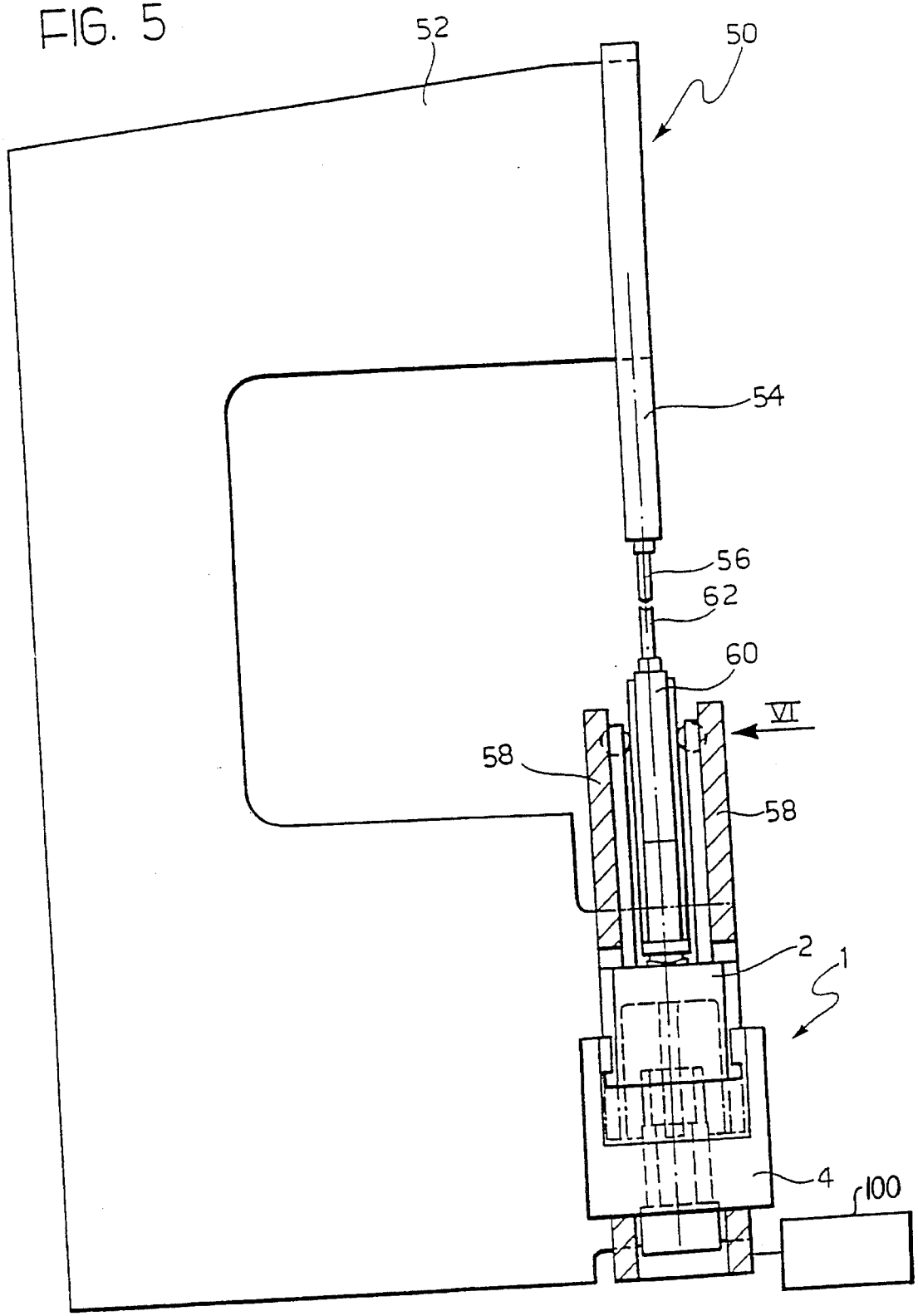

5,488,880

TWO-SPEED LINEAR ACTUATOR DRIVEN BY TWO MOTORS

BACKGROUND OF THE INVENTION

The present invention relates to a linear actuator for a machine, particularly a bending press.

More precisely, the invention relates to a linear actuator according to the pre-characterising portion of claim 1.

From U.S. Pat. No. 4,693,131 a device is known for effecting a linear advance, the device having a fixed base on which a table is mounted for sliding. A male screw is carried for free rotation by the base and is rotatable by a first motor. The male screw engages a female screw which is carried for free rotation by the movable table and is rotatable by a second motor. The two motors can be rotated in the same sense at slightly different speeds to achieve a slow approach stroke or in opposite senses to achieve a fast stroke.

Other linear actuators with male-and-female screw mechanisms in which the male and female screws are associated with respective motors are described in U.S. Pat. Nos. 4,614,128 and 4,703,666.

In many machines, there is a need to cause a tool (for example, the die of a bending press) to perform a linear movement constituted by two clearly distinct stages: an approach stroke, during which the tool must be moved at a high speed of translation with a low thrust (sufficient to overcome the friction, the inertia and possibly the weights of the movable bodies), and a working stroke with exactly the opposite characteristics, that is, a high thrust (in bending presses this may even be of the order of hundreds of tonnes) and a low speed of translation.

The known actuators mentioned above have been found unsuitable for use in a machine of this type. In fact, if the motor for effecting the approach stroke were dimensioned to supply only the low thrust necessary during this stroke, its torque would be insufficient to counteract the high reaction torque acting on the male-and-female screw mechanism during the operation of the motor which operates the working stroke. If the known actuators mentioned above were used in applications for which markedly different thrusts are required, the motor effecting the approach stroke would have to be oversized.

From GB-A-714,003 a metal-cutting machine is known having a fixed structure carrying a movable part. A low-speed motor is fast to the movable part and a high-speed motor is fast to the fixed structure. A female screw is rotatably mounted in the movable part and a male screw—which is in mesh with the female screw—is rotatably mounted in the fixed structure and is driven from the high-speed motor. The female screw is driven from the low-speed motor. An electromagnetic brake has a rotor which is fast to the male screw and has the purpose of holding the male screw against rotation during a low-speed working stroke of the movable part. The device shown in GB-A-714,003 could not be applied to a bending press because of its bulky structure.

SUMMARY OF THE INVENTION

The object of the present invention is to provide an actuator of the type indicated at the beginning which can achieve a slow working stroke with a high thrust and a high-speed approach stroke with a low thrust, the powers of the motors being kept as low as possible, and having a compact structure which allows its application to a bending press.

According to the present invention, this object is achieved by the provision claim 1.

BRIEF DESCRIPTION OF THE DRAWINGS

Further characteristics and advantages of the present invention will become clear in the course of the detailed description which follows with reference to the appended drawings, provided purely by way of non-limiting example, in which:

FIG. 5 is a partially-sectioned schematic side view of a bending press with an actuator according to the present invention.

DETAILED DESCRIPTION OF THE INVENTION

Figure 1:
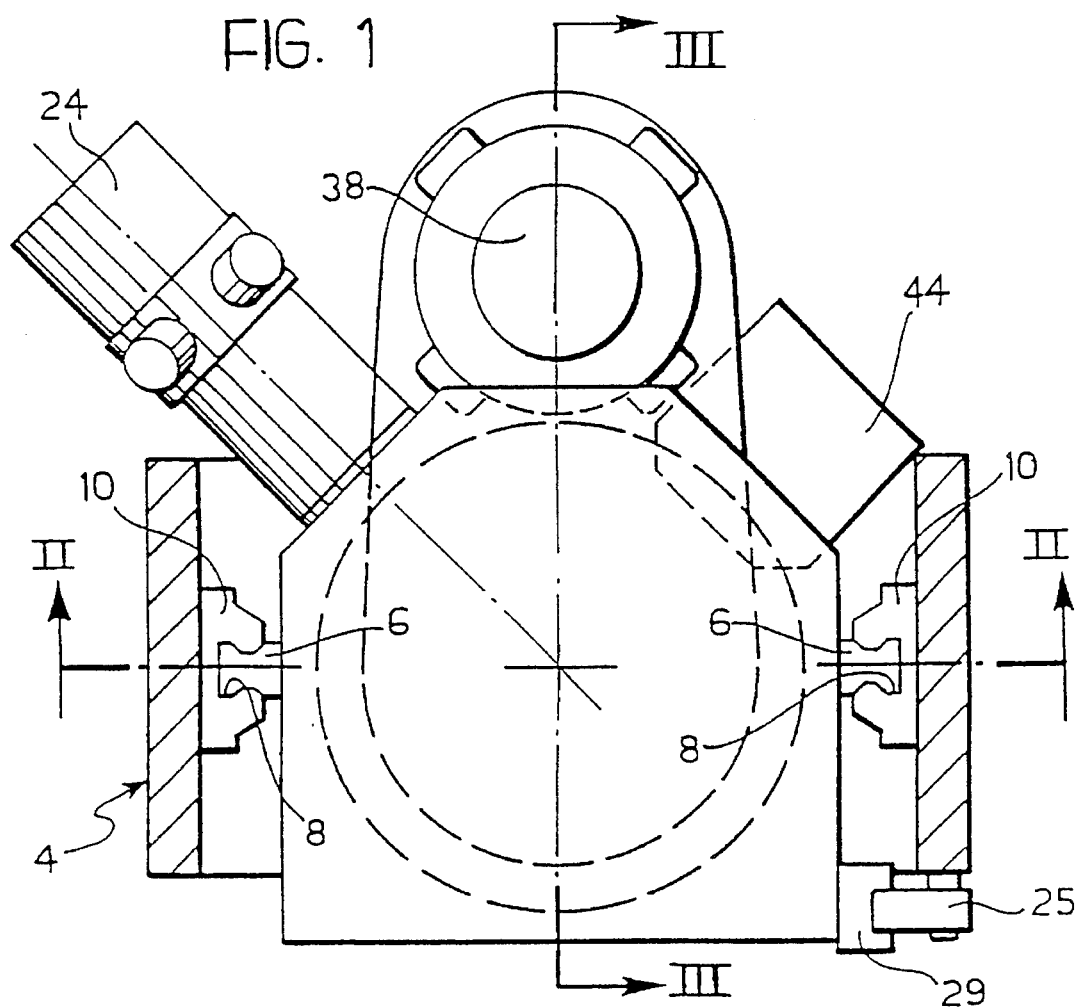
FIG. 1 is a partially-sectioned plan view of an actuator according to the present invention.
Figure 2:
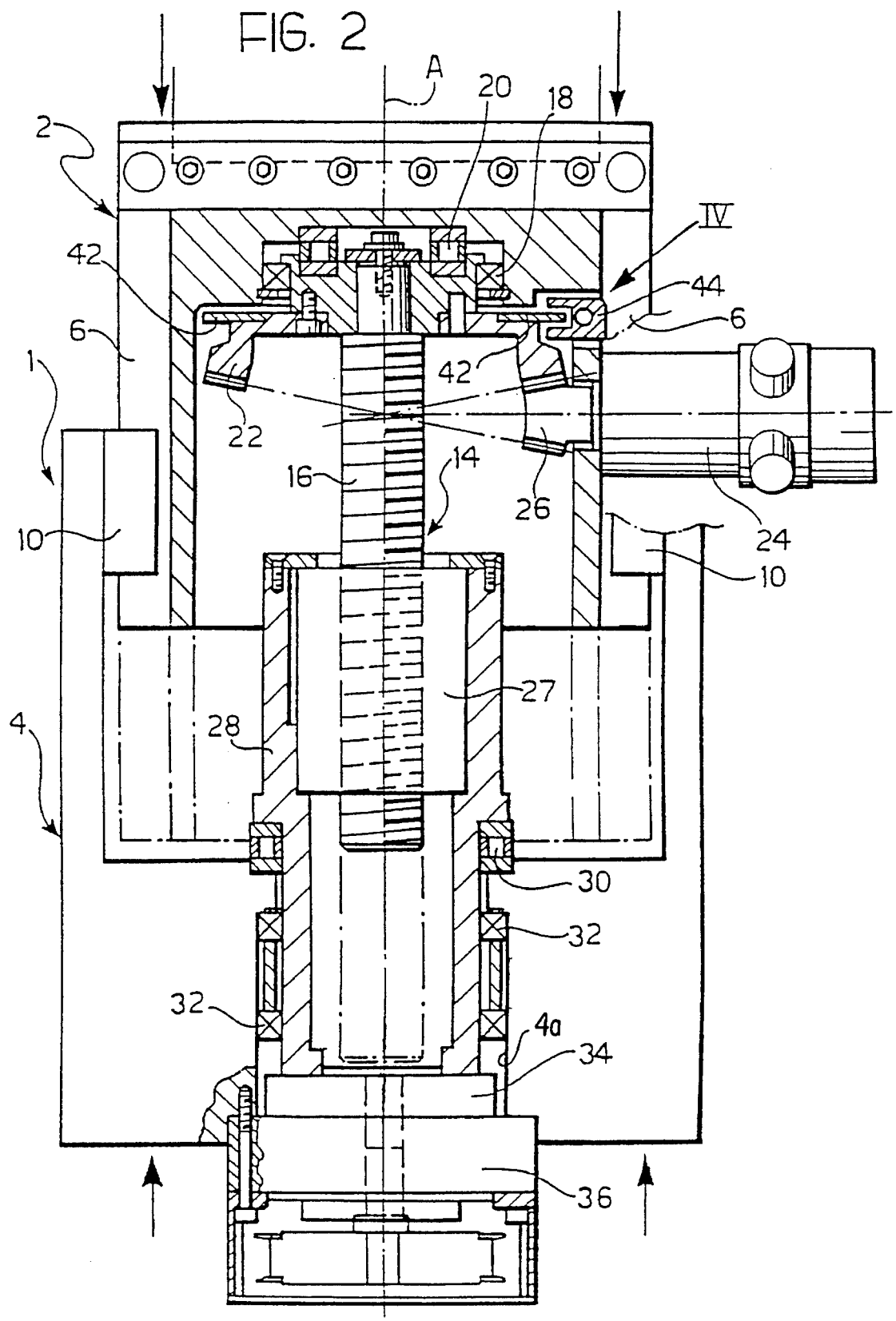
FIGS. 2 and 3 are sections taken on the lines II—II and III—III of FIG. 1.
Figure 3:
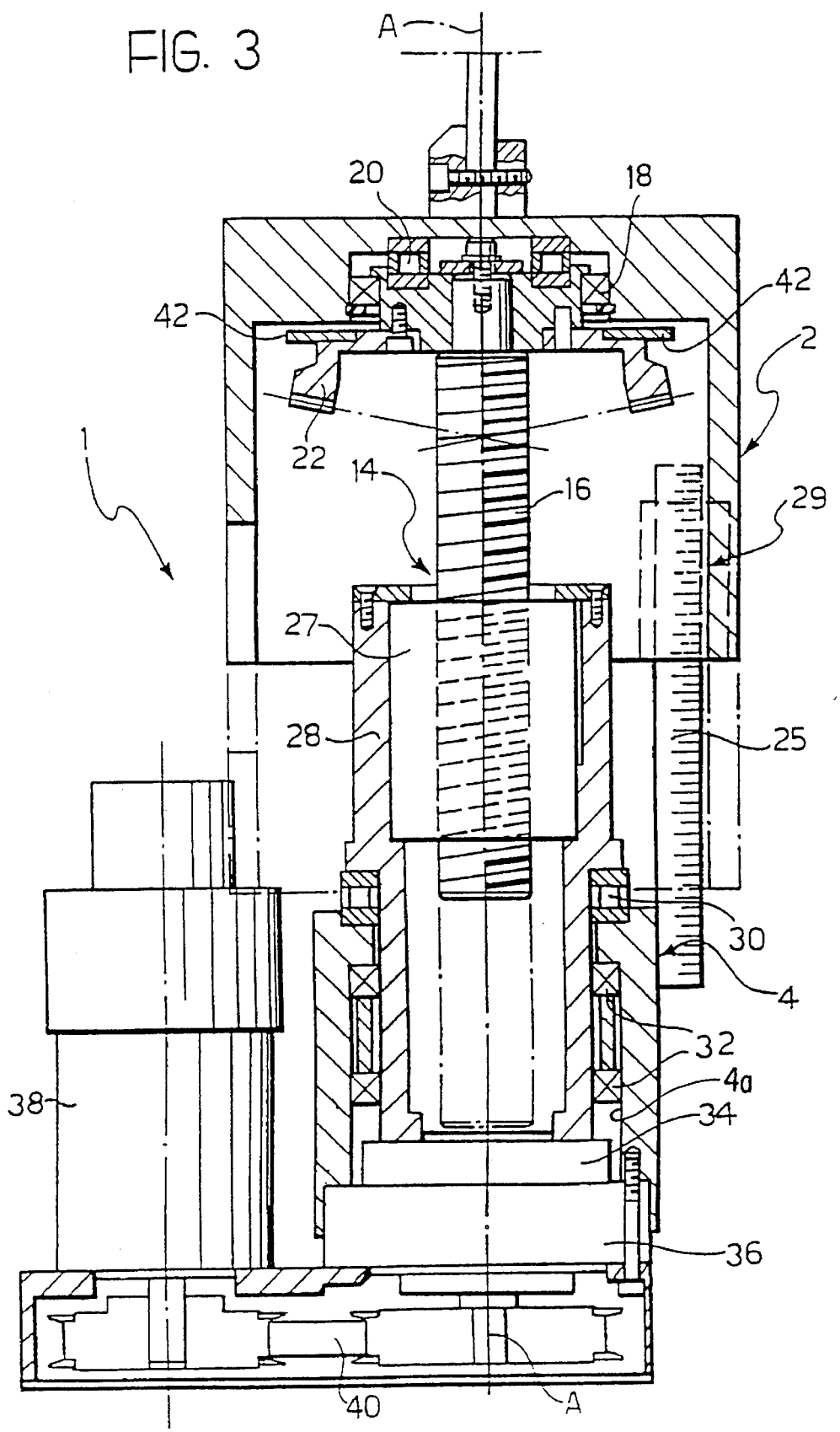

With reference to the drawings, a linear actuator, indicated 1, includes first and second bodies, indicated 2 and 4 respectively, mounted for sliding relative to each other along a working line A. As can be seen in FIGS. 1 and 2, the first body 2 has a pair of diametrally-opposed guides 6 slidable in respective channels 8 formed in guide elements 10 fixed to the second body 4. The body 4 is intended to be fixed to the fixed structure of a machine, such as, for example, a bending press, by means of a conventional fixing system (not shown). The first body 2, however, is intended to be connected to the movable part of the machine, for example, to the punch or the die of the bending press. In FIGS. 2 and 3, a male-and-female screw mechanism is indicated 14, the male screw 16 extending parallel to the working line A and being supported for free rotation by the first body 2 by means of a radial bearing 18 and a thrust bearing 20. A bevel gear 22 is fixed to the screw 16 and is driven, by means of a pinion 26 (FIG. 2), by an electric motor 24 carried by the first body 2.

The male screw 16 engages a female screw 27 carried by a sleeve 28 which in turn is supported for free rotation about the axis A by the second body 4 by means of a thrust bearing 30 and two radial bearings 32. The sleeve 28 is connected to the output member 34 of a mechanical, geared speed-reduction device 36, for example, of the epicyclic type through a hole 4a of said second body 4; and. The reduction device 36 is driven by a second electric motor 38 by means of a toothed belt 40 (FIG. 3).

The respective transmission ratios of the two speed-reduction devices 22, 26 and 36 are substantially different; in particular, the reduction ratio of the device 22, 26 will be low (for example 5:1) and that of the device 36 will be high (for example 100:1).

The male-and-female screw mechanism 14 may be of any known type; because of the large forces involved, it is preferable to use a mechanism with a female screw 27 of the (known) type which has satellite screws and can withstand very large loads whilst maintaining optimal performance.

Figure 4:
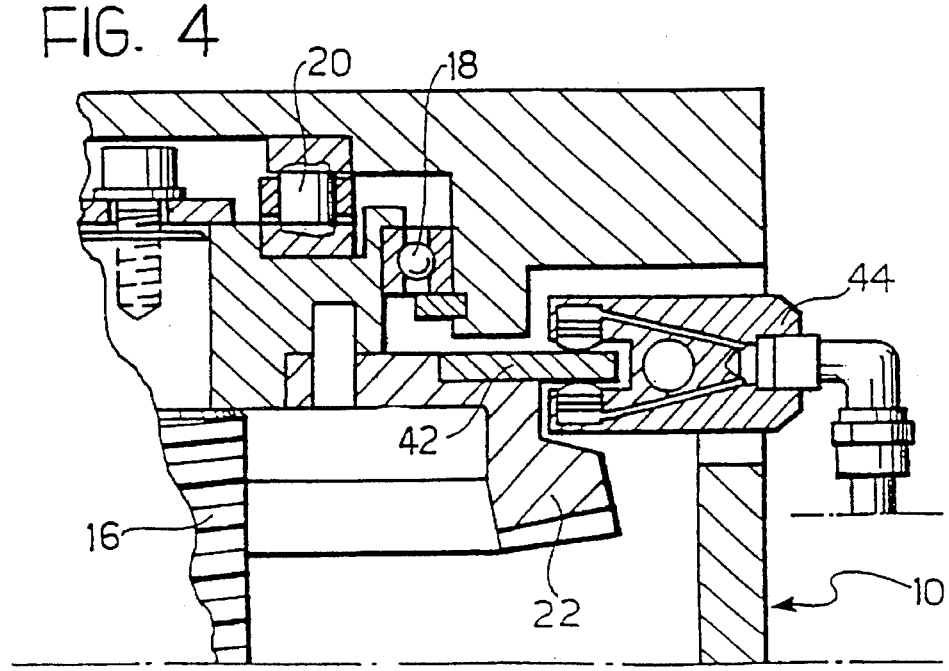
FIG. 4 is a view of the part indicated by the arrow IV in FIG. 3, on an enlarged scale.

An auxiliary braking device is associated with the screw 16 and, in the embodiment shown in FIG. 2, is constituted by a disc brake comprising a disc 42 fixed to the gear 22 and a hydraulically-operable caliper 44 carried by the first body 2 (see in particular FIG. 4).

As will be explained further below, the actuator according to the present invention can perform a working stroke characterised by high thrust and a low speed of translation, driven by the second electric motor 38, and an approach stroke with a high speed of translation and low thrust, driven by the first electric motor 24. In order to achieve very precise positioning during the working stroke, the second electric motor 38 is controlled numerically by a conventional electronic control unit 100. The first electric motor 24 may also be controlled numerically in order to control the speed and position of the tool during the approach stroke.

The numerical, control units which control the two motors 24, 38 use a single transducer which detects the relative displacement of the bodies 2 and 4. The transducer may be constituted by a visible scale 25 fixed to the body 2 and an optical reader 29 carried by the body 4 (FIG. 3).

In order to effect the working stroke, the male screw 16 is made fast with the first body 2 by the application of the disc brake 42, 44 and the female screw 28 is rotated by the second electric motor 38. The working stroke is actually characterised by very high thrust, even of tens of tonnes, with a corresponding reaction torque which is not negligible. The brake 42, 44 must be able to counteract this torque and prevent the male screw from rotating. The ratio of the reduction brought about by the toothed belt 40, the speed-reduction device 36 and the pitch of the screw 16 is such that the first body 2 moves along the working line A at a low speed but with a high thrust, even with the use of a motor 38 of quite low power.

In order to effect the approach stroke, the disc brake 42, 44 is released and the screw 16 is rotated by means of the first electric motor 24. The friction in the speed-reduction device 36 is sufficient to have a restraining effect which prevents the female screw 27 from rotating relative to the second body 4 since, in this case, the thrust is low. Alternatively, this restraining effect may be achieved by the second electric motor 38 which is kept in a stopped condition by its associated control unit. The reduction ratio between the first electric motor 24 and the screw 16 is quite low, and the first body 2 therefore moves at a high speed of translation but with a thrust which can overcome only the small reactions which the tool encounters during its unloaded movements.

Figure 6:
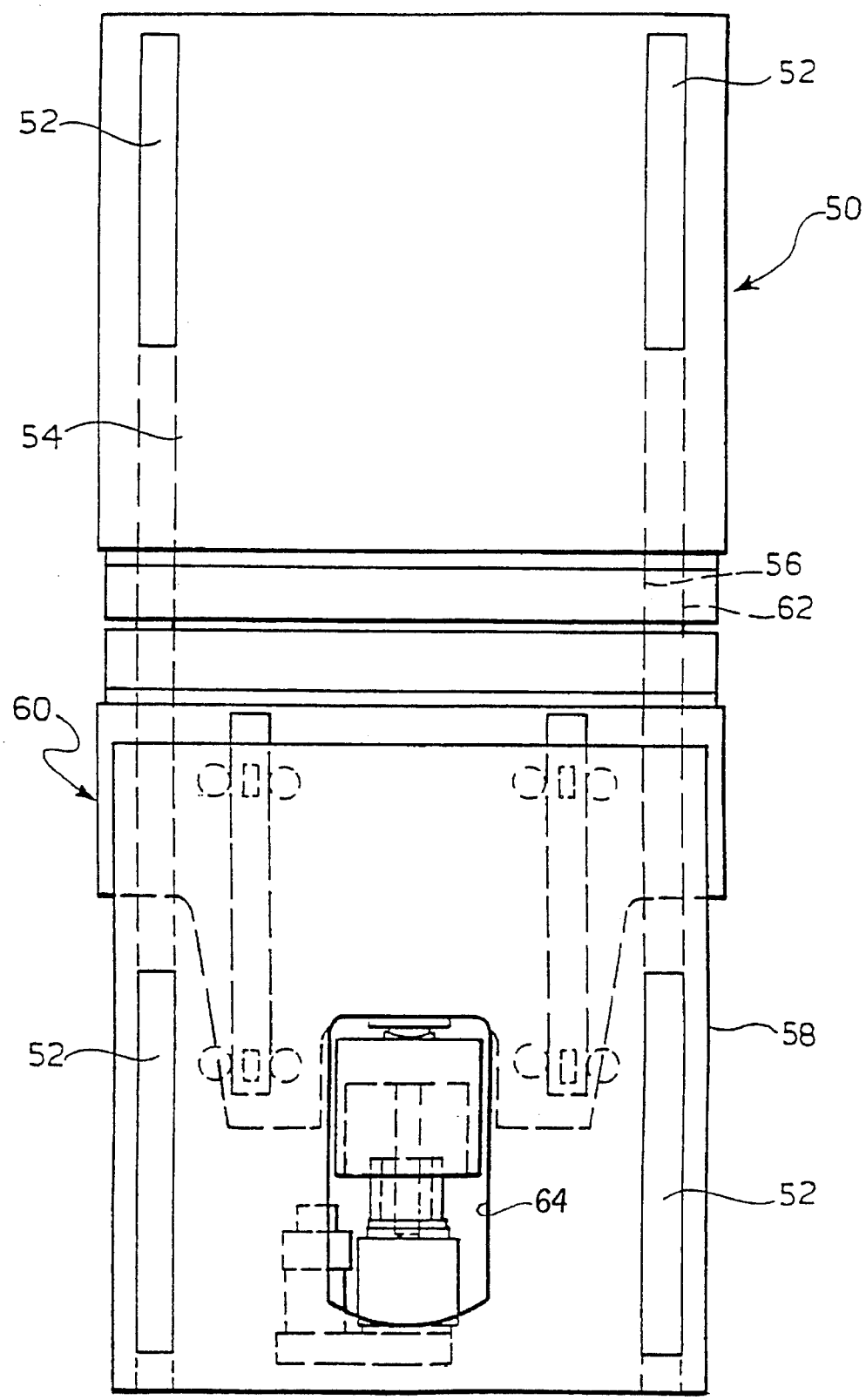
FIG. 6 is a view taken on the arrow VI of FIG. 5.

With reference to FIGS. 5 and 6 a bending press with a linear actuator according to the present invention is indicated 50.

The press 50 includes, in known manner, a support structure 52 carrying an upper, fixed table 54 to which a punch 56 is fixed.

The support structure 52 carries a pair of fixed guide tables 58 between which a movable table 60 carrying a die 62 is slidable.

The movable table is fixed to the first body 2 of the actuator 1 whilst the second body 4 is supported in a hole 64 in the guide table 58.

I claim:

1. A linear actuator for a bending press, comprising:

first and second bodies mounted for sliding relative to each other and interconnected by means of prismatic guides extending parallel to a working line, a male-and-female screw mechanism in which the male screw and the female screw are supported for rotation by the first and the second body, respectively, first and second motors for alternately rotating with substantially different rotational speeds the male screw and the female screw, respectively, and a braking device associated with the member of the male-and-female screw mechanism which is driven with the higher rotational speed, wherein:

a) the motors are associated with respective speed-reduction devices having substantially different reduction ratios, b) each of said bodies has a base portion and a pair of diametrally-opposed elongated members bearing said guides and projecting from the base portion towards the base portion of the other body, in a direction parallel to said working line, c) the base portion of said second body has a through hole in which a hollow sleeve is rotatably supported, the sleeve projecting from the base portion of the second body towards the first body in a direction parallel to said working line, and bearing the female screw, d) the male screw is cantilevered by the base member of the first body and projects towards the second body, a first end of the male screw being rotatably connected to the first body and a second end extending within said hollow sleeve, e) the braking device includes a disc brake comprising a disc fixed to a gear fixed to said member of the male-and-female screw mechanism which is driven with the higher rotational speed.

2. A linear actuator according to claim 1, wherein said hollow sleeve has a length along the working line at least equal to the maximum relative stroke of the bodies.

3. A linear actuator according to claim 1, wherein at least one of said motors extends laterally to the respective body, with its axis of rotation parallel to the working line, and projects towards the other body, said motor being connected to the respective member of the male-and-female screw mechanism by means of a transmission between parallel axes.

4. A linear actuator according to claim 1, wherein the electric motors are controlled by an electronic unit which is adapted to impart predetermined laws of movement to the motors and makes use of a single linear position transducer which detects the relative displacement of the bodies.

5. A bending press comprising a support, a blade and a die and a linear actuator comprising:

first and second bodies mounted for sliding relative to each other and interconnected by means of prismatic guides extending parallel to a working line, a male-and-female screw mechanism in which the male screw and the female screw are supported for rotation by the first and the second body, respectively, first and second motors for alternately rotating with substantially different rotational speeds the male screw and the female screw, respectively, and a braking device associated with the member of the male-and-female screw mechanism, which is driven with the higher rotational speed, wherein:

a) the motors are associated with respective speed-reduction devices having substantially different reduction ratios, b) each of said bodies has a base portion and a pair of diametrally-opposed elongated members bearing said guides and projecting from the base portion towards the base portion of the other body, in a direction parallel to said working line, c) the base portion of said second body has a through hole in which a hollow sleeve is rotatably supported, the sleeve projecting from the base portion of the second body towards the first body in a direction parallel to said working line and bearing the female screw, d) the male screw is cantilevered by the base member of the first body and projects towards the second body, a first end of the male screw being rotatably connected to the first body and a second end extending within said hollow sleeve, e) the braking device includes disc brake comprising a disc fixed to a gear fixed to said member of the male-and-female screw mechanism which is driven with the higher rotational speed.

6. A bending press as in claim 5, wherein said hollow sleeve has a length along the working line at least equal to the maximum relative stroke of the bodies.

7. A bending press as in claim 5, wherein at least one of said motors extends laterally to the respective body, with its axis of rotation parallel to the working line, and projects towards the other body, said motor being connected to the respective member of the male-and-female screw mechanism by means of a transmission between parallel axes.

8. A bending press as in claim 5, wherein the electric motors are controlled by an electronic unit which is adapted to impart predetermined laws of movement to the motors and makes use of a single linear position transducer which detects the relative displacement of the bodies.

* * * * *